US009852478B2

(12) United States Patent
Herzig et al.

(10) Patent No.: US 9,852,478 B2
(45) Date of Patent: Dec. 26, 2017

(54) IDENTIFYING INFLUENCERS IN COMPUTER NETWORKS

(71) Applicant: International Business Machines Corporation, Armonk, NY (US)

(72) Inventors: Jonathan Herzig, Tel-Aviv (IL); Yosi Mass, Ramat Gan (IL); Haggai Roitman, Yoknea'm Elit (IL)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 14/463,681

(22) Filed: Aug. 20, 2014

(65) Prior Publication Data

US 2016/0055253 A1 Feb. 25, 2016

(51) Int. Cl.
*G06F 17/30* (2006.01)
*G06Q 50/00* (2012.01)

(52) U.S. Cl.
CPC ....... *G06Q 50/01* (2013.01); *G06F 17/30867* (2013.01)

(58) Field of Classification Search
CPC .................................................. G06Q 50/01
See application file for complete search history.

(56) References Cited

U.S. PATENT DOCUMENTS 8,375,024 B2 2/2013 Goeldi
9,171,089 B2 † 10/2015 Gross
2008/0082491 A1 4/2008 Scofield et al.
2010/0131507 A1* 5/2010 Pradhan ............ G06F 17/30699 707/737
2011/0252027 A1* 10/2011 Chen ................. G06F 17/30525 707/728
2012/0209832 A1* 8/2012 Neystadt ................ G06Q 50/01 707/723

(Continued)

OTHER PUBLICATIONS

Kong et al.,"A Tweet-Centric Approach for Topic-Specific Author Ranking in Micro-Blog", Advanced Data Mining and Applications, Lecture Notes in Computer Science vol. 7120, pp. 138-151, 2011.

(Continued)

*Primary Examiner* — Etienne Leroux
*Assistant Examiner* — Dara J Glasser

(57) ABSTRACT

Identifying influencers in a computer network by adjusting influence weights of corresponding participants of a computer network, where the influence weights relate to a topic, where each of the influence weights is adjusted in accordance with a predefined adjustment function, and where the predefined adjustment function uses a) the influence weight of any of the participants that disseminated content via the computer network, where the content relates to the participant whose influence weight is being adjusted, b) a participant topic similarity value of any of the participants that disseminated the content, where the participant topic similarity value relates to the topic, and c) a relationship topic similarity value of any relationship between the participants that disseminated the content and the participant whose influence weight is being adjusted, where the relationship topic similarity value relates to the topic, and then ranking the participants by their influence weights.

17 Claims, 8 Drawing Sheets

(56) References Cited

U.S. PATENT DOCUMENTS

| | | | |
|---|---|---|---|
| 2013/0254283 A1* | 9/2013 | Garcia-Martinez | G06Q 50/01 709/204 |
| 2013/0297581 A1 | 11/2013 | Ghosh et al. | |
| 2014/0140625 A1* | 5/2014 | Zhang | G06K 9/00677 382/195 |
| 2015/0286646 A1† | 10/2015 | Gross | |

OTHER PUBLICATIONS

Cano et al., "Social influence analysis in microblogging platforms—a topic-sensitive based approach". Semantic Web, 2011.

Tang et al., "Social influence analysis in large-scale networks.", KDD '09 Proceedings of the 15th ACM SIGKDD international conference on Knowledge discovery and data mining, pp. 807-816, 2009.

Weng et al., "Twitterrank: finding topic-sensitive influential twitterers.", WSDM '10 Proceedings of the third ACM international conference on Web search and data mining, pp. 261-270, 2010.

Barbieri et al., "Topic-aware social influence propagation models.", In Proceedings of the 2012 IEEE 12th International Conference on Data Mining, ICDM '12, pp. 81-90, 2012.

Bi et al., "Scalable topic-specic influence analysis on microblogs.", In Proceedings of the 7th ACM International Conference on Web Search and Data Mining, WSDM '14, pp. 513-522, 2014.

Cha et al., "Measuring User Influence in Twitter: The Million Follower Fallacy.", ICWSM '10: Proceedings of international AAAI Conference on Weblogs and Social, 2010.

Silva et al., "Profilerank: Finding relevant content and influential users based on information diffusion", In Proceedings of the 7th Workshop on Social Network Mining and Analysis, SNAKDD '13, article 2, 2013.

Shmueli-Scheuer et al., "Extracting user proles from large scale data.", In Proceedings of the 2010 Workshop on Massive Data Analytics on the Cloud, MDAC '10, Article 4, 2010.

Teng et al., "Coevolution of network structure and content.", WebSci '12 Proceedings of the 4th Annual ACM Web Science Conference, pp. 288-297, 2012.

Shi et al., "A compression framework for generating user profiles.", In SIGIR Workshops, 2010.

Roitman et al., "Modeling the uniqueness of the user preferences for recommendation systems.", SIGIR '13 Proceedings of the 36th international ACM SIGIR conference on Research and development in information retrieval pp. 777-780, 2013.

\* cited by examiner
† cited by third party

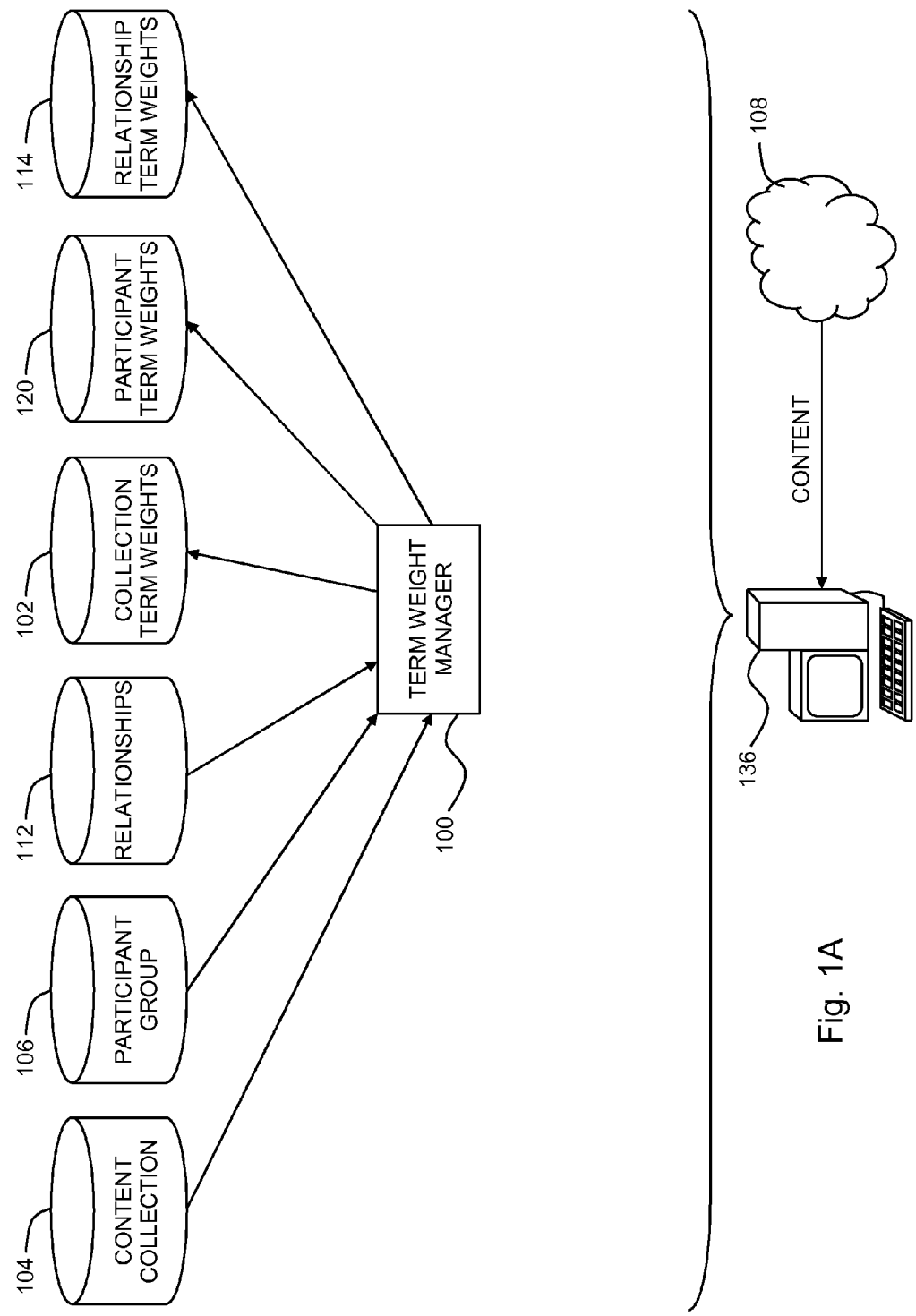

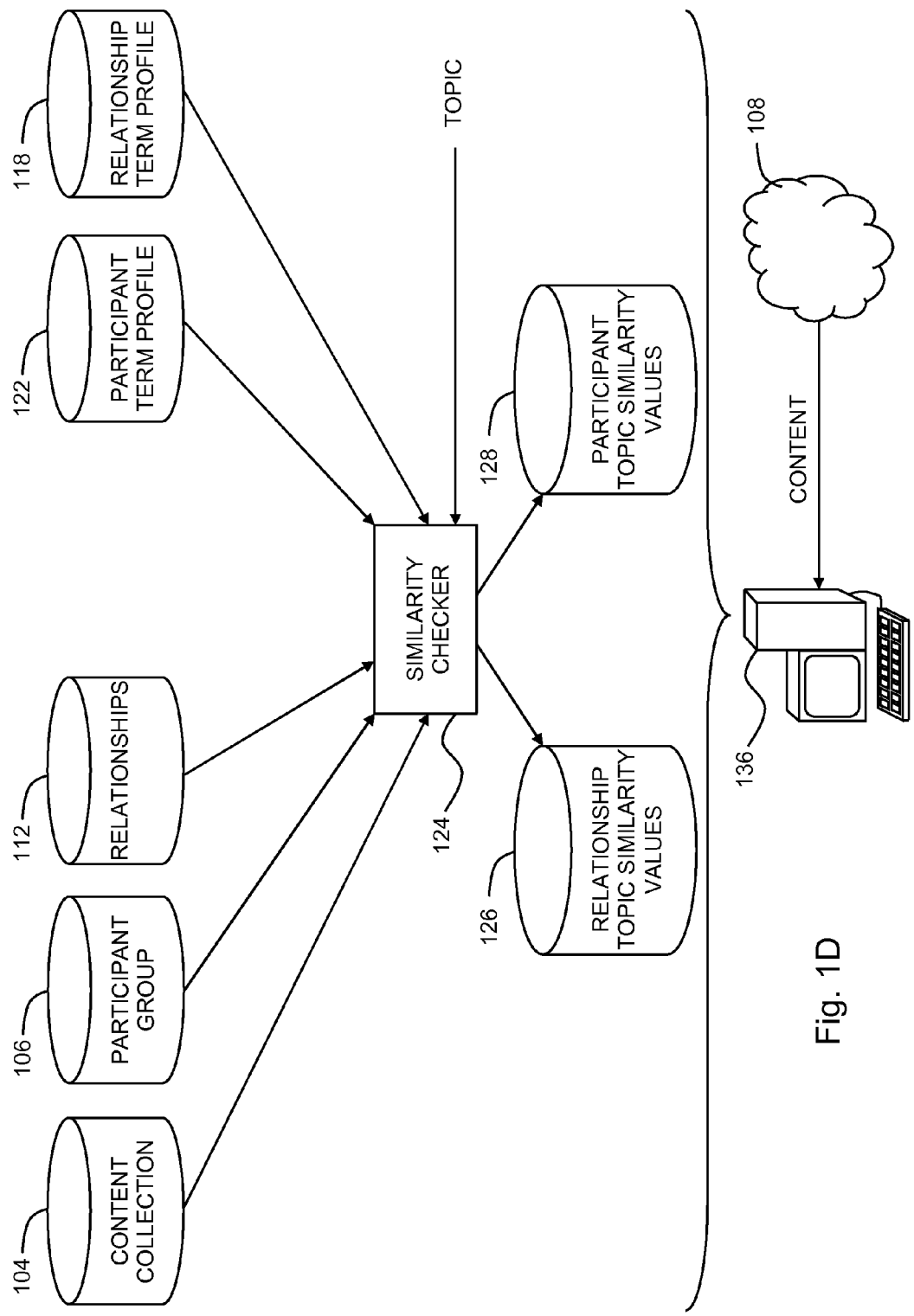

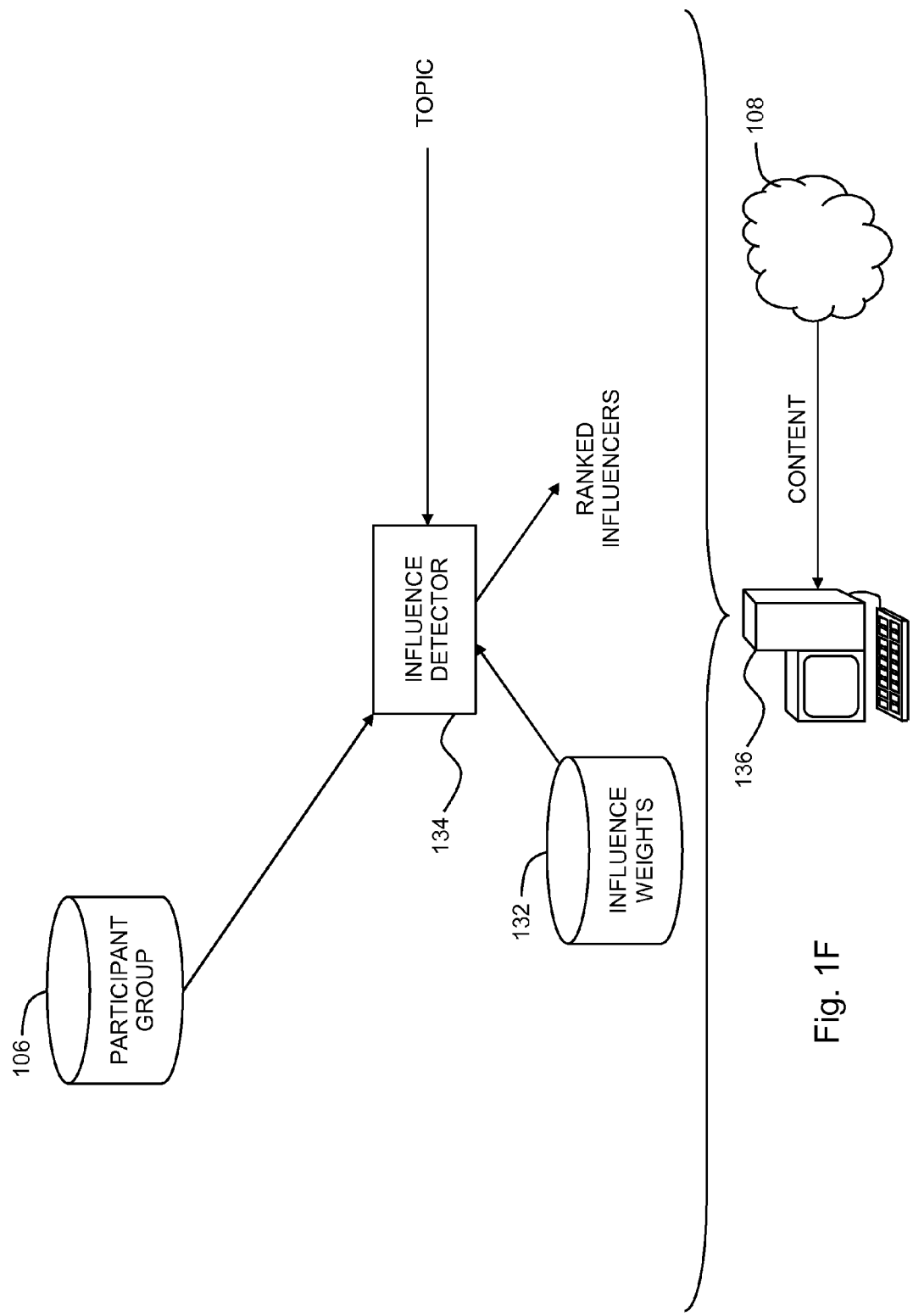

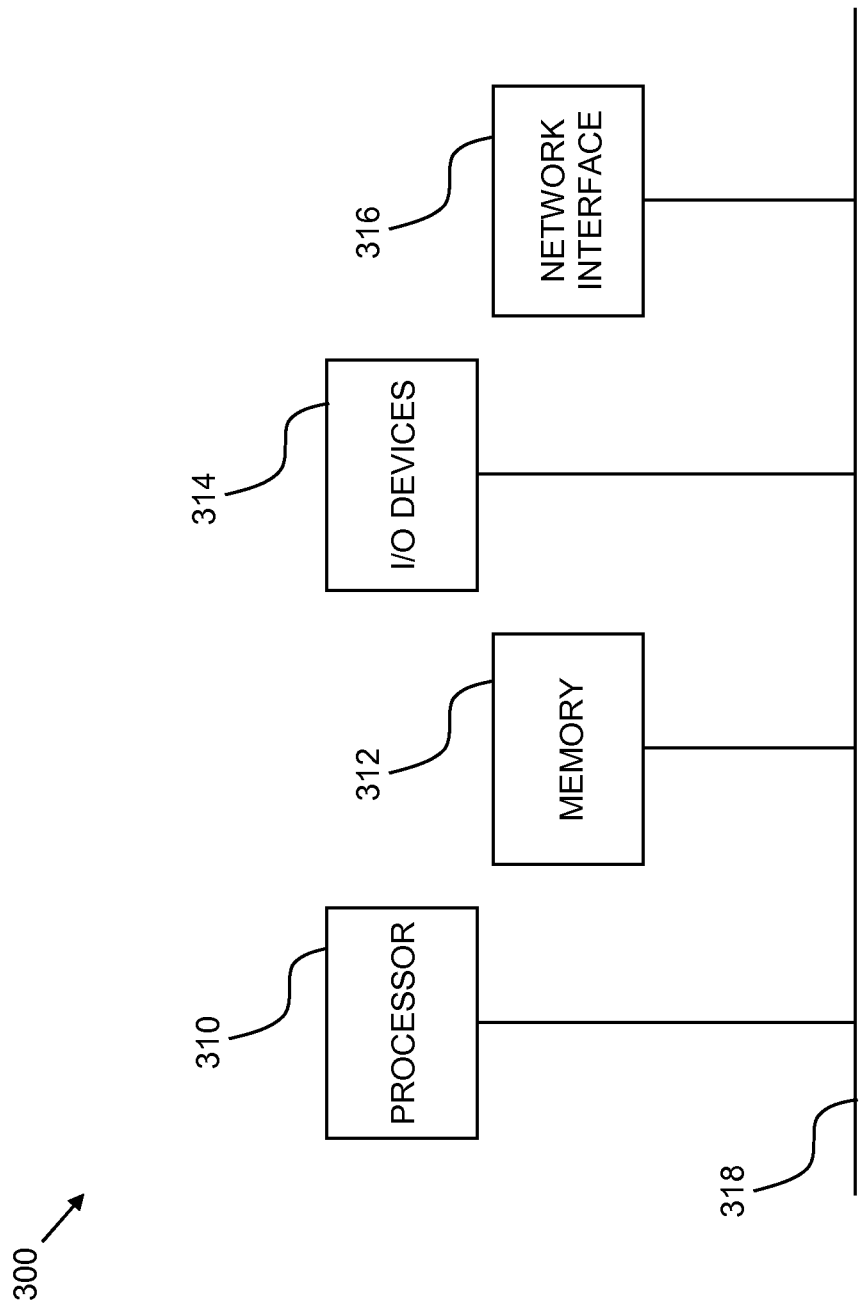

IDENTIFYING INFLUENCERS IN COMPUTER NETWORKS

BACKGROUND

Individuals and organizations that use computer network-based social media such as blogs, Twitter™, and Facebook™, to disseminate content, such as information, ideas, or opinions, to others, often influence the content recipients to react to the content in various ways, such as where the recipients themselves disseminate the content via social media, discuss one or more topics related to the content on social media, or endorse, follow, or cite the "influencer" via social media. Identifying influencers has become one of the most essential tasks in social media analysis, as influencers are recognized for playing an important role in many domains. For example, in the marketing domain influencers are often utilized to spread content related to a marketing campaign in an effort to maximize the campaign's overall reach. Social-networking services, such as the professional networking service LinkedIn™, utilize influencers to expose other users of such services to advertiser-sponsored content and services.

SUMMARY

In one aspect of the invention a method is provided for identifying influencers in a computer network, the method including adjusting a plurality of influence weights of a corresponding plurality of participants of a computer network, where the influence weights relate to a topic, where each of the influence weights is adjusted in accordance with a predefined adjustment function, and where the predefined adjustment function uses the influence weight of any of the participants that disseminated content via the computer network, where the content relates to the participant whose influence weight is being adjusted, a participant topic similarity value of any of the participants that disseminated the content, where the participant topic similarity value relates to the topic, and a relationship topic similarity value of any relationship between the participants that disseminated the content and the participant whose influence weight is being adjusted, where the relationship topic similarity value relates to the topic, and ranking the participants by their influence weights.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which:

FIGS. 1A-1F, taken together, is a simplified conceptual illustration of a system for identifying influencers in a computer network, constructed and operative in accordance with an embodiment of the invention;

FIG. 3 is a simplified block diagram illustration of an exemplary hardware implementation of a computing system, constructed and operative in accordance with an embodiment of the invention.

DETAILED DESCRIPTION

Figure 1B:
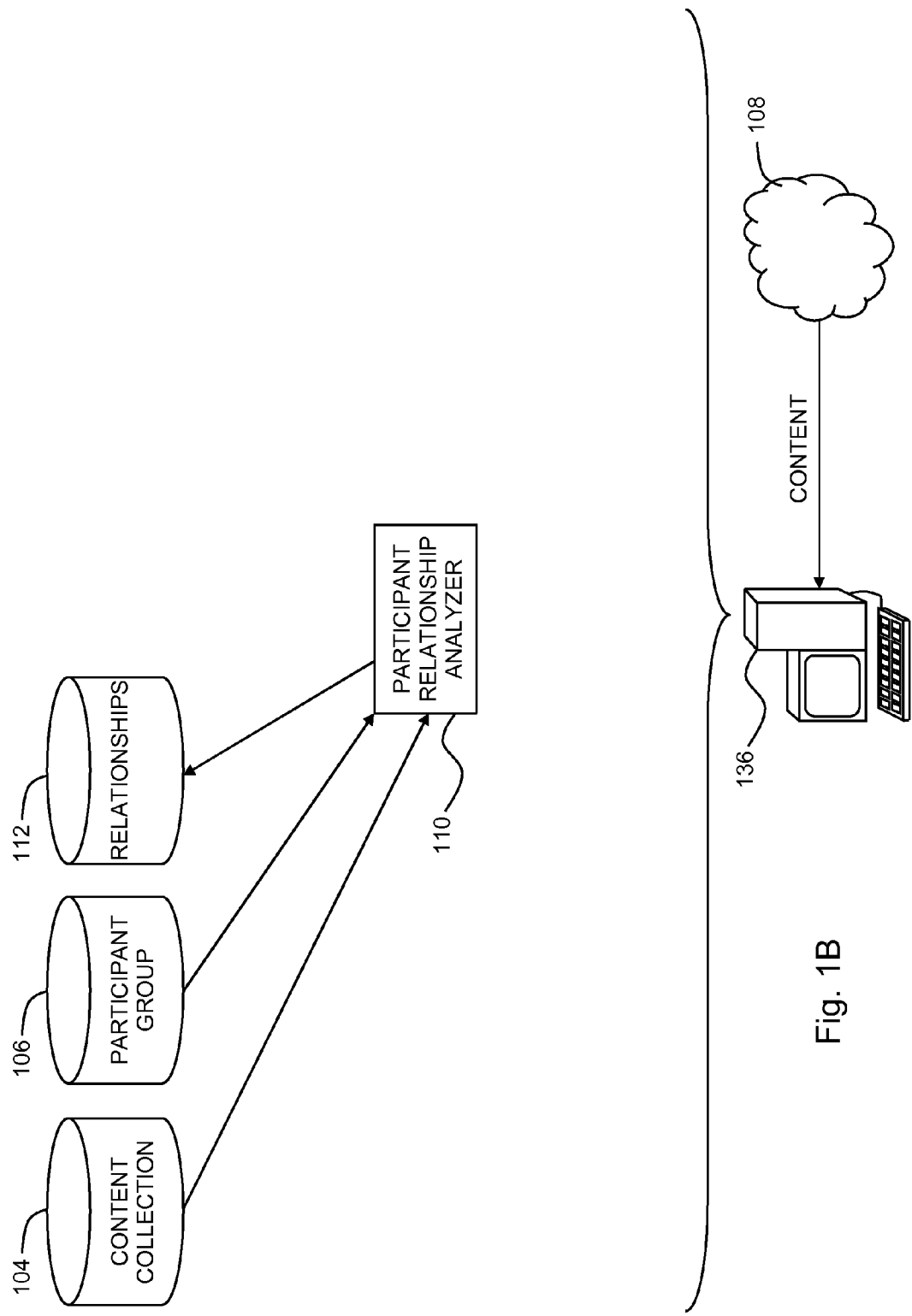
Figure 1C:
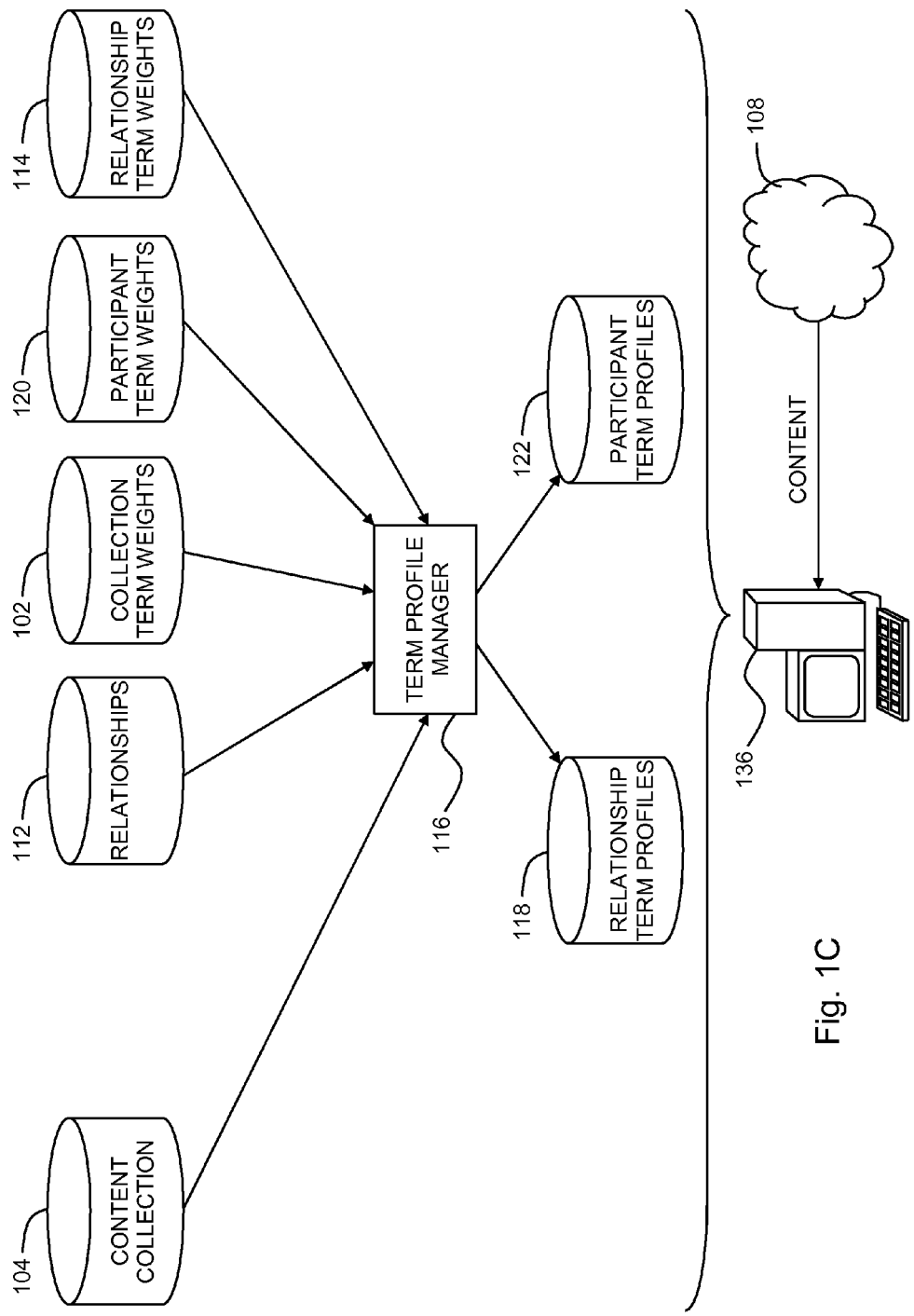
Figure 1E:
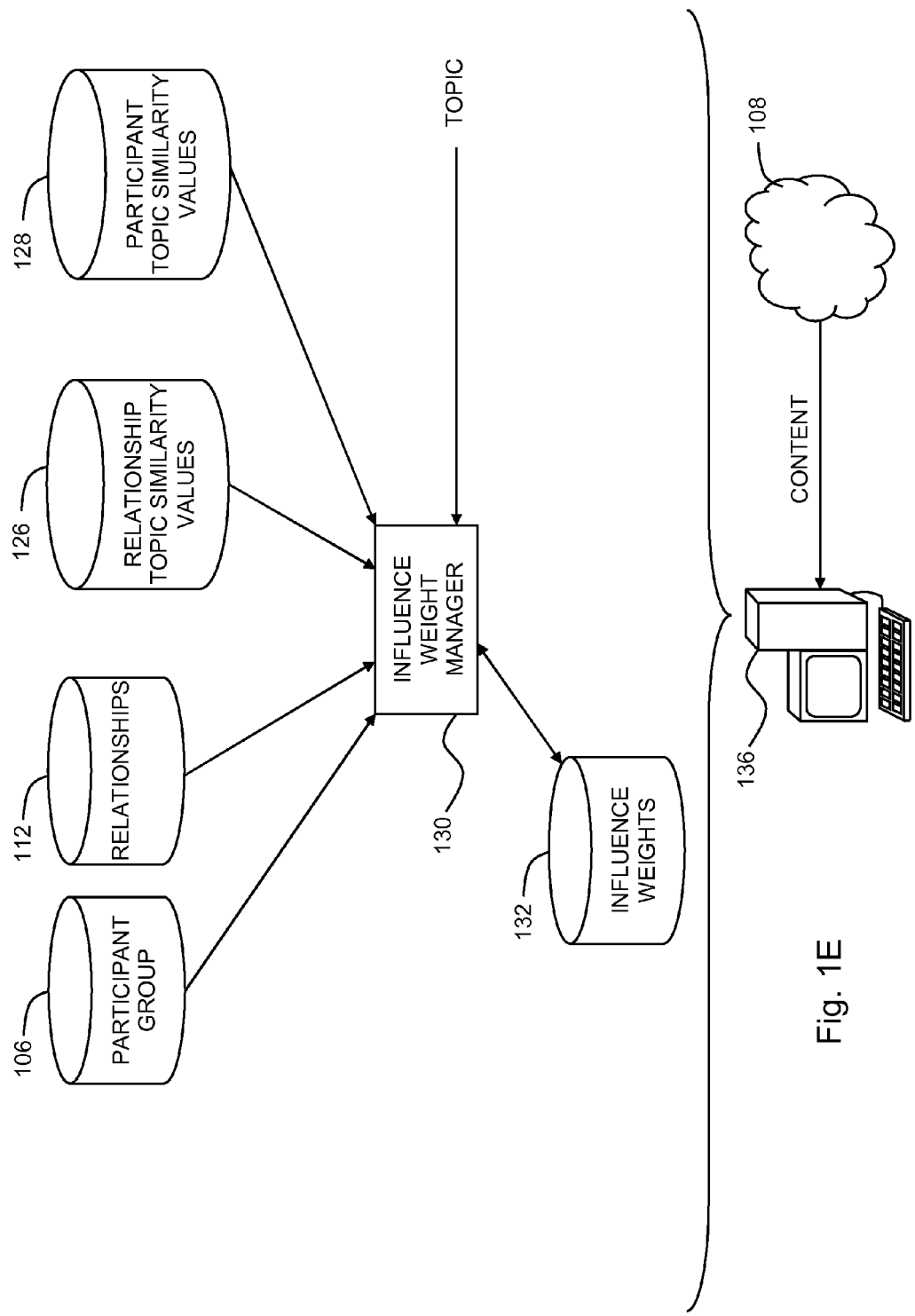

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIGS. 1A-1F which, taken together, is a simplified conceptual illustration of a system for identifying influencers in a computer network, constructed and operative in accordance with an embodiment of the invention. In the system of FIGS. 1A-1F a term weight manager 100 (FIG. 1A) is configured to determine a collection term weight 102 associated with any, and preferably each, term found in a collection 104 of content, where collection 104 preferably includes content disseminated by a group 106 of individuals or organizations, hereinafter referred to as "participants,", via a computer network 108, such as via the Internet in general in the form of web pages or "blogs," or via computer-based social media networks such as Twitter™ and Facebook™ in the form of "tweets" or other postings. Term weight manager 100 preferably determines each collection term weight corresponding to a term in collection 104 in accordance with a predefined weight function, which may be any known weight function, such as using term frequency (tf) weighting or term frequency-inverse document frequency (tf-idf) weighting.

A participant relationship analyzer 110 (FIG. 1B) is configured to identify relationships 112 among the participants in group 106, where each of the relationships is associated with a pair of the participants and is preferably associated with content in collection 104 that is disseminated by one of the participants in the pair via computer network 108 and that relates to the other participant in the pair, such as where a relationship between user A and user B is associated with content disseminated by user A that mentions user B or that is in reply to content disseminated by user B, or where user A disseminates content that was previously disseminated by user B, such as a Twitter™ "retweet."

Term weight manager 100 also preferably determines a relationship term weight 114 associated with any, and preferably each, of the relationships in relationships 112 and for any, and preferably each, of the terms that appear in content associated with the relationship. Term weight manager 100 preferably determines the relationship term weight 114 in accordance with the predefined weight function for each relationship content term.

A term profile manager 116 (FIG. 1C) is configured to include in a relationship term profile 118 associated with any, and preferably each, of the relationships any term that appears in content associated with the relationship and that has a statistically-significant greater relationship term weight 114 associated with the relationship content term than collection term weight 102 associated with the term. Term profile manager 116 preferably normalizes to 1 the total sum of the relationship term weights 114 associated with the relationship, normalizes to 1 the total sum of the collection term weights 102, and then uses Kullback-Leibler (KL) divergence to identify the top k statistically-significant terms for inclusion in the relationship term profile 118, where k may be user-defined. One such method for employing KL divergence is described in "Extracting user profiles from large scale data," Michal Shmueli-Scheuer, et al., MDAC '10: *Proceedings of the* 2010 *Workshop on Massive Data Analytics on the Cloud*, New York, N.Y., USA, ACM, (2010).

Term weight manager 100 also preferably determines a participant term weight 120 associated with any, and preferably each, of the participants in group 106 and for any, and preferably each, of the terms that appear in content disseminated by the participant via computer network 108. Term weight manager 100 preferably determines the participant term weight 120 in accordance with the predefined weight function for each participant content term relative to other terms that appear in content disseminated by the participant via computer network 108.

Term profile manager 116 also preferably includes in a participant term profile 122 associated with any, and preferably each, of the participants any term that appears in content disseminated by the participant via computer network 108 and that has a statistically-significant greater participant term weight 120 associated with the participant content term than collection term weight 102 associated with the term. Term profile manager 116 preferably normalizes to 1 the total sum of the participant term weights 120 associated with the participant, uses the similarly normalized total sum of the collection term weights 102, and then uses Kullback-Leibler divergence to identify the top l statistically-significant terms for inclusion in the participant term profile 122, where l may be user-defined.

A similarity checker 124 (FIG. 1D) is configured to determine a relationship topic similarity value 126 associated with any, and preferably each, of the relationships in relationships 112 and with a topic that includes one or more of the terms in collection 104, where each of the topic terms is preferably associated with a topic term weight indicating an importance of the topic term relative to the other topic terms. Similarity checker 124 preferably determines each relationship topic similarity value 126 based on the degree to which a relationship's relationship term profile 118 is similar to the topic using any known similarity measurement, such as using cosine similarity.

Similarity checker 124 also preferably determines a participant topic similarity value 128 associated with any, and preferably each, of the participants in group 106 and with the topic. Similarity checker 124 preferably determines each participant topic similarity value 128 based on the degree to which a participant's participant term profile 122 is similar to the topic using any known similarity measurement.

An influence weight manager 130 (FIG. 1E) is configured to determine an influence weight 132 for any, and preferably each, of the participants in group 106 in association with the topic. Influence weight manager 130 preferably initializes the influence weight of each participant to 1/N, where N is the number of participants for which influence weight 132 is determined. Influence weight manager 130 adjusts the influence weight 132 of the participants in accordance with a predefined adjustment function, where the predefined adjustment function uses the influence weights 132 and participant topic similarity values 128 of any, and preferably each, of the participants in group 106 that have a relationship in relationships 112 with the participant whose influence weight is being adjusted, where the relationship is associated with content that relates to the participant whose influence weight is being adjusted, as well as the relationship topic similarity values 126 of these relationships.

Influence weight manager 130 preferably adjusts the influence weight 132 of the participants one or more times until a predefined convergence condition is met, such as where the average change of the influence weights 132 during a given adjustment cycle is <1% or as may otherwise be user-defined.

An influencer detector 134 (FIG. 1F) is configured to rank the participants in group 106 by their influence weights 132, and identify as influencers with respect to the topic the top m participants having the greatest influence weights 132 among all of the participants for which influence weight 132 is determined, where m may be user-defined.

Any of the elements shown in FIGS. 1A-1F are preferably implemented by one or more computers, such as by a computer 136, in computer hardware and/or in computer software embodied in a non-transitory, computer-readable medium in accordance with conventional techniques.

Figure 2:
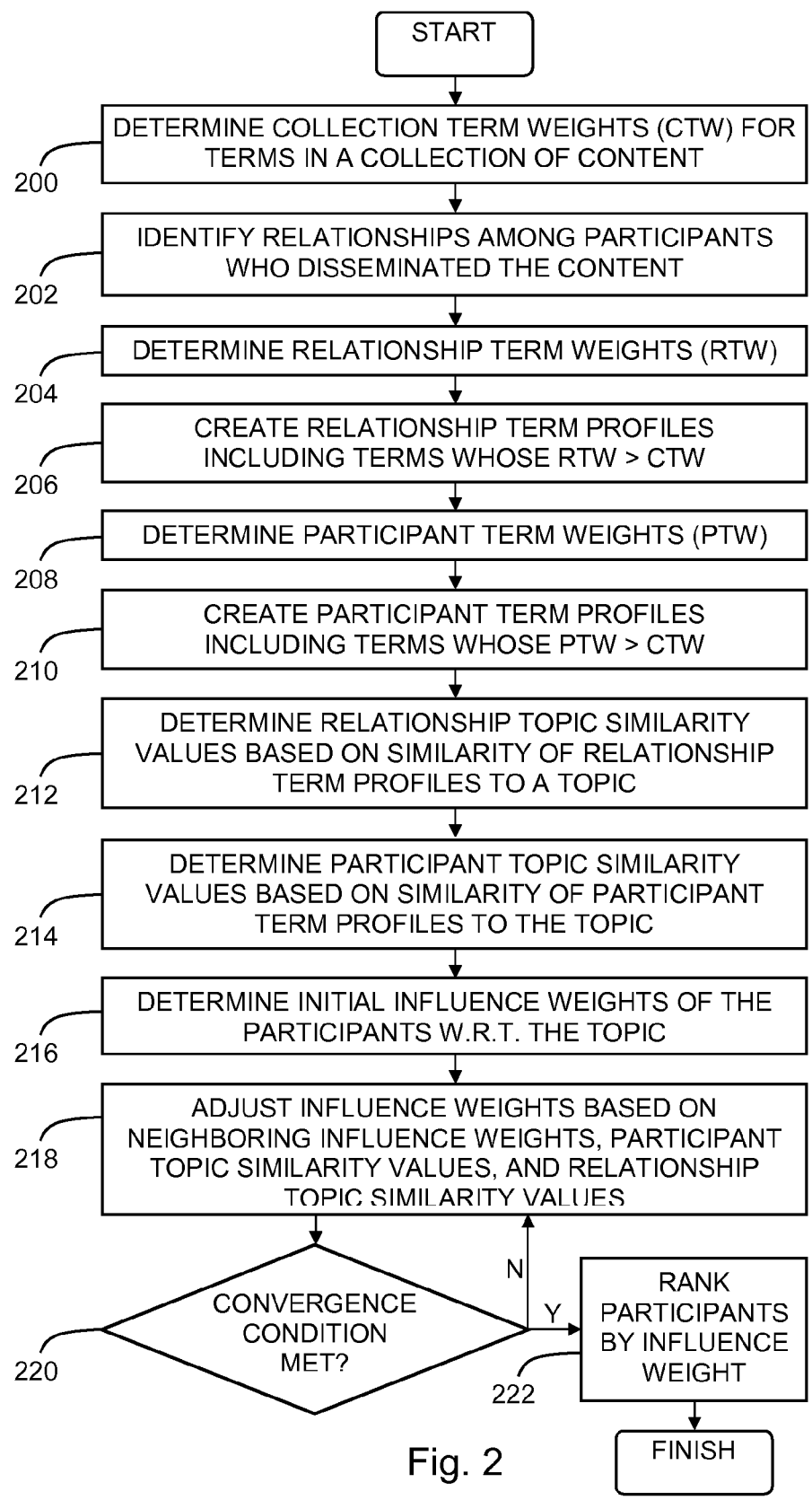
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIGS. 1A-1F, operative in accordance with an embodiment of the invention. In the method of FIG. 2, collection term weights are determined for terms found in a collection of content, where the collection of content preferably includes content disseminated by via a computer network by participants thereof (step 200). Relationships are identified among the participants, where each of the relationships is associated with a pair of the participants and is preferably associated with content in collection that is disseminated by one of the participants in the pair via the computer network and that relates to the other participant in the pair (step 202). Relationship term weights are determined for the relationships in association with terms that appear in content associated with the relationships (step 204). Relationship term profiles are created for the relationships, where the relationship term profile for a relationship includes terms that appear in content associated with the relationship and that have statistically-significant greater relationship term weights than collection term weights (step 206). Participant term weights are determined for the participants in association with terms that appear in content disseminated by the participants via the computer network (step 208). Participant term profiles are created for the participants, where the participant term profile for a participant includes terms that appear in content disseminated by the participant via the computer network and that have statistically-significant greater participant term weights than collection term weights (step 210). Relationship topic similarity values are determined for the relationships in association with a topic that includes one or more of the terms in the collection, where the relationship topic similarity value for a relationship is based on the degree to which the relationship's relationship term profile is similar to the topic (step 212). Participant topic similarity values are determined for the participants in association with the topic, where the participant topic similarity value for a participant is based on the degree to which the participant's participant term profile is similar to the topic (step 214). Influence weights are initially determined for the participants in association with the topic (step 216) and adjusted in accordance with a predefined adjustment function based on the influence weights and participant topic similarity values of participants that have a relationship the participant whose influence weight is being adjusted, where the relationship is associated with content that relates to the participant whose influence weight is being adjusted, as well as based on the relationship topic similarity values of these relationships (step 218). The influence weights are adjusted one or more times until a predefined convergence condition is met (step 220). The participants are ranked by their influence weights, where the top m participants having the greatest influence weights are identified as influencers with respect to the topic (step 222).

The influence weight of a given participant u may be expressed using the following formula:

$$R'_T(u) = d \cdot \alpha_T(u) + (1-d) \cdot \left( RD_T(u)\alpha_T(u) + \sum_{v \in In(u)} R_T(v)\beta_T(e_{vu}) \right)$$

where:
d is a user-defined factor which determines whether more importance is given to the participant topic similarity value of participant u, or to the relationship topic similarity values of the relationships with other participants who disseminated content relating to participant u;
$RD_T(u)$ is the sum of influence weights of participants about whom there is no content relating to such participants in a collection of content (e.g., no content mentions these participants, is in reply to content disseminated by these participants, or includes content disseminated by these participants);

α$_T$(u) is the participant topic similarity value of participant u;

In(u) is the set of participants who have relationships with participant u by having disseminated content relating to participant u;

β$_T$(e$_{vu}$) is the relationship topic similarity value of the relationship with another participant who disseminated content relating to participant u; and R$_T$(v) is the influence weight (at the end of the last iteration) for a user v who cited a user u.

Referring now to FIG. 3, block diagram 300 illustrates an exemplary hardware implementation of a computing system in accordance with which one or more components/methodologies of the invention (e.g., components/methodologies described in the context of FIGS. 1A-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying influencers in a computer network, the method comprising:

adjusting a plurality of influence weights of a corresponding plurality of participants of the computer network, wherein the influence weights relate to a topic, wherein each of the influence weights is adjusted in accordance with a predefined adjustment function, and wherein the predefined adjustment function is:

$$R'_T(u) = d * \alpha_\tau(u) + (1-d) * \left( RD_\tau(u) \alpha_\tau(u) + \sum_{v \in \text{In}(u)} R_\tau(v) \beta_\tau(e_{vu}) \right)$$

where:

d is a user-defined factor which determines whether more importance is assigned to a participant topic similarity value of participant u, or to a plurality of relationship topic similarity values of relationships with other participants who disseminated content relating to participant u;

RDT(u) is a sum of the influence weights of a portion of the plurality of participants about whom there is no content relating to said portion of the plurality of participants in a collection of content;

αT(u) is the participant topic similarity value of the participant u;

In(u) is a set of participants who have a relationship with the participant u by having disseminated the content relating to the participant u;

βT(evu) is a relationship topic similarity value of a relationship with another participant who disseminated the content relating to the participant u; and RT(v) is an influence weight for a user v who cited the participant u;

ranking the plurality of participants by their influence weights; and transmitting the content via a portion of the plurality of participants with a rank above a threshold.

2. The method according to claim 1 and further comprising performing the adjusting a plurality of times until a predefined convergence condition is met.

3. The method according to claim 1 and further comprising determining the influence weight of any of the plurality of participants.

4. The method according to claim 1 and further comprising:

determining the relationship topic similarity value, wherein the relationship topic similarity value is determined by a degree to which a relationship term profile associated with a relationship is similar to the topic; and determining the participant topic similarity value associated with the participant u, wherein the participant topic similarity value is determined by a degree to which a participant term profile associated with the participant u is similar to the topic.

5. The method according to claim 4 and further comprising identifying a plurality of relationships among the plurality of participants, wherein each of the plurality of relationships is associated with a pair of the plurality of the participants and is associated with content that is disseminated by one of the participants in the pair via the computer network and that relates to the other participant in the pair.

6. The method according to claim 4 and further comprising:

determining a collection term weight associated with any of a plurality of terms in the collection of content, wherein the collection of content includes content disseminated by the plurality of participants;

determining a relationship term weight associated with one of the relationships and any terms that appear in content associated with the one of the relationships; and determining a participant term weight associated with one of the plurality of participants and any terms that appear in content disseminated by the one of the plurality of participants via the computer network.

7. The method according to claim 6 and further comprising:
including in the relationship term profile associated with a particular relationship a first term that appears in content associated with the particular relationship and that has a statistically-significant greater relationship term weight associated with the first term and the particular relationship than a collection term weight associated with the first term; and
including in the participant term profile associated with a particular participant a second term that appears in content disseminated by the particular participant via the computer network and that has a statistically-significant greater participant term weight associated with the second term and the particular participant than a collection term weight associated with the second term.

8. The method of claim 1 wherein the adjusting and ranking are implemented in any of
computer hardware, and
computer software embodied in a non-transitory, computer-readable medium.

9. A system for identifying influencers in a computer network, the system comprising:
a processor to:
adjust a plurality of influence weights of a corresponding plurality of participants of the computer network, wherein the influence weights relate to a topic, wherein each of the influence weights is adjusted in accordance with a predefined adjustment function, and wherein the predefined adjustment function is:

$$R'_T(u) = d * \alpha_T(u) + (1-d) * \left( RD_\tau(u) \alpha_T(u) + \sum_{v \in \text{In}(u)} R_\tau(v) \beta_\tau(e_{vu}) \right)$$

where:
d is a user-defined factor which determines whether more importance is assigned to a participant topic similarity value of participant u, or to a plurality of relationship topic similarity values of relationships with other participants who disseminated content relating to participant u;
RDT(u) is a sum of the influence weights of a portion of the plurality of participants about whom there is no content relating to said portion of the plurality of participants in a collection of content;
αT(u) is the participant topic similarity value of the participant u;
In(u) is a set of participants who have a relationship with the participant u by having disseminated the content relating to the participant u;
βT(evu) is a relationship topic similarity value of a relationship with another participant who disseminated the content relating to the participant u; and
RT(v) is an influence weight for a user v who cited the participant u;
rank the plurality of participants by their influence weights; and
transmit the content via a portion of the plurality of participants with a rank above a threshold.

10. The system according to claim 9 wherein the processor is to adjust the influence weights a plurality of times until a predefined convergence condition is met.

11. The system according to claim 9 wherein the processor is to determine the influence weight of any of the plurality of participants.

12. The system according to claim 9, wherein the processor is to:
determine the relationship topic similarity value, wherein the relationship topic similarity value is determined by a degree to which a relationship term profile associated with a relationship is similar to the topic, and
determine the participant topic similarity value associated with the participant u, wherein the participant topic similarity value is determined by a degree to which a participant term profile associated with the participant u is similar to the topic.

13. The system according to claim 12, wherein the processor is to identify a plurality of relationships among the plurality of participants, wherein each of the plurality of relationships is associated with a pair of the plurality of the participants and is associated with content that is disseminated by one of the participants in the pair via the computer network and that relates to the other participant in the pair.

14. The system according to claim 12, wherein the processor is to:
determine a collection term weight associated with any of a plurality of terms in the collection of content, wherein the collection of content includes content disseminated by the plurality of participants,
determine a relationship term weight associated with one of the relationships and any terms that appear in the content associated with the one of the relationships, and
determine a participant term weight associated with one of the plurality of participants and any terms that appear in content disseminated by the one of the plurality of participants via the computer network.

15. The system according to claim 14, wherein the processor is to:
include in the relationship term profile associated with a particular relationship a first term that appears in content associated with the particular relationship and that has a statistically-significant greater relationship term weight associated with the first term and the particular relationship than a collection term weight associated with the first term, and
include in the participant term profile associated with a particular participant a second term that appears in content disseminated by the particular participant via the computer network and that has a statistically-significant greater participant term weight associated with the second term and the particular participant than a collection term weight associated with the second term.

16. A computer program product for identifying influencers in a computer network, the computer program product comprising:
a non-transitory, computer-readable storage medium; and
computer-readable program code embodied in the storage medium, wherein the computer-readable program code is configured to
adjust a plurality of influence weights of a corresponding plurality of participants of the computer network, wherein the influence weights relate to a topic, wherein each of the influence weights is adjusted in accordance with a predefined adjustment function, and wherein the predefined adjustment function is:

$$R'_T(u) = d * \alpha_T(u) + (1-d) * \left( RD_T(u) \alpha_T(u) + \sum_{v \in \text{In}(u)} R_T(v) \beta_T(e_{vu}) \right)$$

where:

d is a user-defined factor which determines whether more importance is assigned to a participant topic similarity value of participant u, or to a plurality of relationship topic similarity values of relationships with other participants who disseminated content relating to participant u;

RDT(u) is a sum of the influence weights of a portion of the plurality of participants about whom there is no content relating to said portion of the plurality of participants in a collection of content;

αT(u) is the participant topic similarity value of the participant u;

In(u) is a set of participants who have a relationship with the participant u by having disseminated the content relating to the participant u;

βT(evu) is a relationship topic similarity value of a relationship with another participant who disseminated the content relating to the participant u; and RT(v) is an influence weight for a user v who cited the participant u; and wherein the computer-readable program code is configured to rank the plurality of participants by their influence weights and transmit the content via a portion of the plurality of participants with a rank above a threshold.

17. The computer program product according to claim 16 wherein the computer-readable program code is configured to perform the adjusting a plurality of times until a predefined convergence condition is met.

* * * * *